United States Patent
Naimark et al.

(10) Patent No.: US 7,231,063 B2
(45) Date of Patent: Jun. 12, 2007

(54) FIDUCIAL DETECTION SYSTEM

(75) Inventors: Leonid Naimark, Brookline, MA (US); Eric Foxlin, Arlington, MA (US)

(73) Assignee: InterSense, Inc., Bedford, MA (US)

(*) Notice: Subject to any disclaimer, the term of this patent is extended or adjusted under 35 U.S.C. 154(b) by 676 days.

(21) Appl. No.: 10/215,503

(22) Filed: Aug. 9, 2002

(65) Prior Publication Data

US 2004/0028258 A1 Feb. 12, 2004

(51) Int. Cl.
*G06K 9/00* (2006.01)

(52) U.S. Cl. ........................ 382/103; 348/169

(58) Field of Classification Search ........ 382/100, 382/103, 107, 151, 201, 291; 348/92, 94, 348/95, 135, 136, 139, 140, 142, 169, 207, 348/207.99; 345/156, 158, 135; 901/47; 702/153; 700/253
See application file for complete search history.

(56) References Cited

U.S. PATENT DOCUMENTS

| | | | |
|---|---|---|---|
| 3,553,438 A | | 1/1971 | Blitz |
| 3,971,917 A | | 7/1976 | Maddox et al. |
| 5,521,843 A | * | 5/1996 | Hashima et al. ............. 700/253 |
| 5,832,139 A | | 11/1998 | Batterman et al. |
| 5,856,844 A | * | 1/1999 | Batterman et al. ...... 348/207.99 |
| 6,064,749 A | * | 5/2000 | Hirota et al. ................ 382/103 |
| 6,681,031 B2 | * | 1/2004 | Cohen et al. ................ 382/103 |

FOREIGN PATENT DOCUMENTS

WO 98/54593 12/1998

OTHER PUBLICATIONS

Gatrell, L., Hoff, W. and Sklair, C., "Robust Image Feature: Concentric Contrasting Circles and Their Image Extraction", SPIE Proceedings, Cooperative Intelligent Robotics in Space II, 1991, Boston.

Sklair, C., Hoff, and Gatrell, L., "Accuracy of Locating Circular Features Using Machine Vision", SPIE Proceedings, Cooperative Intelligent Robotics in Space II, 1991, Boston.

Hoff, W., Nguyen, K. and Lyon, T., "Computer Vision-based registration techniques for augmented reality", Proceedings of IRCV, SPIE vol. 2904, 1996, Boston.

Neumann, U. and Cho, Y., "A Self-tracking Augmented Reality System", Proceedings of ACM VRST, 1996.

(Continued)

*Primary Examiner*—Samir Ahmed
*Assistant Examiner*—Abolfazi Tabatabai
(74) *Attorney, Agent, or Firm*—Fish & Richardson P.C.

(57) ABSTRACT

A new fiducial design allows having thousands of different codes. These fiducials are printed on a standard black-and-white (or color) printer and easily could be mounted on a walls, ceiling and objects in a room. The design includes "solid" outside mono-color ring and 2-D dense inside coding scheme. Image processing algorithms are implemented in Smart Camera with a built-in DSP to run all required image-processing tasks. A tracking system implementation includes an inertial measurement unit and one outward-looking wide-angle Smart Camera with possible extensions to number of stationary inward-looking cameras. The system operates in various real-world lighting conditions without any user intervention due to homomorphic image processing processes for extracting fiducials in the presence of very non-uniform lighting.

33 Claims, 9 Drawing Sheets

OTHER PUBLICATIONS

Cho, Y., Lee, J. and Neumann, U., "A Multi-Ring Fiducial Ssytem and an Intensity-Invariant Detection Method for Scalable Augmented Reality", IWAR, San Francisco, 1998.

State, A., Hirota, G., Chen, D., Garrett, W. and Livingston, M., "Superior Augmented Realtiy Registration by Integrating Landmark Tracking and Magnetic Tracking", Proceedings of SIGGRAPH, 1996.

Billinghurst, M. and Kato, H., "Collaborative Mixed Reality", Proceedings of 1st Intl. Symposium on Mixed Reality (ISMR), 1999.

You, S. and Neumann, U., "Fusion of Vision and Gyro Tracking for Robust Augmented Reality Registration", Proceedings of IEEE VR2001, 2001.

Thomas, G.A., Jin, J. and Urquhart, C., "A Versatile Camera Position Measurement System for Virtual Reality TV Production", Intl. Broadcasting Convention, Amsterdam, 1997.

Feiner, S., Bell, B., Gagas, E., Gilven, S., Hallaway, D., Höllerer, T., Lok, S., Oiwal, A., Tang, J., Tinna, N. and Yamamoto, R., "Mobile Augmented Reality Systems", ACM SIGGRAPH '01 Emerging Technologies, Los Angeles, CA, 2001.

IEEE and ACM International Symposium on Augmented Reality, New York City, 2001.

2002 IEEE International Conference on Robotics and Automation, Washington, D.C., 2002.

Foxlin, E. M., "Generalized Architecture for Simultaneous Localization, Auto-Calibration, and Map-building", Proceedings of 2002 IEEE/RSJ Intl. Conf. on Intelligent Robots and Systems, Switzerland, 2002.

Naimark, L. and Foxlin, E., "Circular Data Matrix Fiducial System and Robust Image Orocessing for a Wearable Vision-Inertial Self-Tracker", IEEE International Symposium on Mixed and Augmented Reality (ISMAR 2002), Sep. 30-Oct. 2, 2002, Darmstadt, Germany.

* cited by examiner

FIDUCIAL DETECTION SYSTEM

TECHNICAL FIELD

This invention relates to a fiducial detection system.

BACKGROUND

Vision-based tracking may be used to track two-dimensional (2D) locations of fiducials in an image, or track three dimensional (3D) positions of fiducials using two or more cameras (outside-looking-in), or for wide-area tracking by placing fiducials in the environment (for example on ceiling) and mounting one or more cameras on the tracked object (vehicle, camera, person, etc.) and solving for the object's position and/or orientation based on the 2D bearings from the cameras to the fiducials and the known locations of the fiducials in the environment.

Such wide-area tracking capability might be used for mobile robots, augmented reality (AR), camera tracking (e.g. for television virtual sets, movie special effects), virtual reality walkthroughs, firefighter localization, AUTs, RPVs, UAVs, AGVs, etc. Most of these applications involve solving for the 6-DOF pose (position and orientation) of the tracked object, but some robotics or vehicular applications may only require the 2D position and the heading direction.

Augmented reality (AR) is a technology that merges virtual objects with the real world, typically by using a semi-transparent head-mounted display (HMD) to superimpose virtual objects on a user's view of the real world (called optical AR), or by using real and virtual cameras and merging their outputs on a display screen (called video AR). In video AR, a real video camera generates images of the real environment, and a virtual camera generates images of 3D graphics models to enhance a user's perception of and interaction with the real world. Accurate registration between real and virtual scene elements needs to be achieved to make AR systems useful in real applications. To achieve this registration, it is necessary to accurately track the position and orientation of the optical see-through HMD or the real video camera in real time. Techniques for achieving accurate tracking can be generally divided into two areas, non-vision technology and vision-based technology. Vision-based AR systems detect fiducials or natural features using image processing or computer vision techniques to solve the registration problem.

One problem in AR is development of a tracking system that can provide high accuracy, very low latency, and a very wide tracking area. For many AR applications, including large-scale manufacturing, and outdoor applications, the area of operation is so large that a wearable computer must be used to drive the AR head-mounted display.

Motion tracking measures and reports an object's position and orientation as it changes in time. For example, when a user moves a computer mouse and the cursor mirrors that movement, the user is tracking motion in a very simple way. Motion tracking facilitates the interaction between people and computers. Historically, the lack of smooth and rapid tracking of the user's motion has blocked commercial acceptance of immersive 3D computer graphics. To be successful, the perspective of the virtual image seen by the computer must be an accurate representation of what is seen in the real world. As the user's head or camera moves, turns, or tilts, the computer-generated environment must change accordingly with no noticeable lag, jitter or distortion.

SUMMARY

In an aspect, the invention features a fiducial mark for detection by a camera including a circular outer perimeter, and patterns on an inside of the outer perimeter for reading an identity code including higher information density per area than a pattern of concentric rings.

One or more of the following may be included. The mark may also include a two dimensional (2D) array of encoding areas, each of the encoding areas having a color selected from a set of N colors, and having approximately equal sizes. The mark may also include features for establishing a reference frame for reading the patterns.

The perimeter and the patterns may have contrasting colors. The perimeter may be a single color and the color may be black. The encoding areas inside the circular outer perimeter may be contiguous with the circular outer ring to segment as one large blob, and may also include one or more small blobs inside the circular outer perimeter designated as indexing features. The features may include a feature used to establish an origin, a feature used to establish an x-axis position, and a feature used to establish a y-axis position.

In another aspect, the invention features a method for finding a centroid of an outer rim of a fiducial including capturing an image of the fiducial, filling an interior of the fiducial image to match a color of the outer rim resulting in one solid ellipse-like shape, and calculating the centroid of the one solid ellipse-like shape.

One or more of the following may be included. Capturing the image may also include using a logarithm of the image for contrast enhancement.

In another aspect, the invention features a method including determining a centroid of a framing object and all interior objects of a fiducial image, and calculating a centroid of a virtual filled object using a formula for the centroid of a combination object.

In another aspect, the invention features a method of detecting fiducial marks including capturing an image of a fiducial mark, the fiducial mark including a circular outer perimeter, patterns on an inside of the outer perimeter for reading an identity code including higher information density per area than a pattern of concentric rings, a two dimensional (2D) array of encoding areas, each of the encoding areas having a color selected from a set of N colors, and having approximately equal sizes and features for establishing a reference frame for reading the patterns, determining an origin of the image from a first feature, determining an x-axis position of the image from a second feature, and determining a y-axis position of the image from a third feature.

One or more of the following may be included. Capturing may include using a logarithm of the image for contrast enhancement.

In another aspect, the invention features a tracking system including a camera for capturing an image, an inertial measurement unit, and a sensor fusion core including a means for detecting a fiducial within the image.

One or more of the following may be included. The fiducial may include a circular outer perimeter, patterns on an inside of the outer perimeter for reading an identity code including higher information density per area than a pattern of concentric rings, a two dimensional (2D) array of encoding areas, each of the encoding areas having a color selected from a set of N colors, and having approximately equal sizes, and features for establishing a reference frame for reading the patterns. The means for detecting the fiducial may include determining an origin of the fiducial from a first feature, determining an x-axis position of the fiducial from a second feature, and determining a y-axis position of the fiducial from a third feature. The system may also include a plurality of cameras.

In another aspect, the invention features a two-dimensional (2D) fiducial for image processing including an outer ring of 1 u width, two data rings, each data ring having a 1 u width, and an inner ring with 1 u width, wherein u is one length unit.

One or more of the following may be included. The outer ring may be colored black. The inner ring may include a black circle with a white eye in a center. The white eye may have a diameter of ⅜ u. Each of the data rings may include eight sectors with 45° degrees for each sector. The eight sectors may include five sectors containing data cells, two sectors colored white with a ⅜ u black eye inside, and one sector colored black, the black colored sector positioned between the two white sectors and guaranteeing connectivity of all black color into a single blob. The two sectors are located 1⅞ u from the center.

In another aspect, the invention features an image processing target including a black colored outer ring of 1 u width, two data rings, each data ring having a 1 u width and including eight sectors with 45° for each sector, and an inner ring of 1 u width comprising a black circle with a white eye in a center.

One or more of the following may be included. The eight sectors may include five sectors containing data cells, two sectors colored white with a ⅜ u black eye inside, and one sector colored black, the black colored sector positioned between the two white sectors and guaranteeing connectivity of all black color into a single blob.

In another aspect, the invention features a method of fiducial acquisition in motion tracking systems including finding candidate objects, downsampling an original image to 320×240 for speed, enhancing a contrast of the image, detecting an edge of the image, filtering blurs, binarizing with a threshold value, and selecting a final candidate.

One or more of the following may be included. Selecting the final candidate may include eroding the image along a horizontal direction to remove objects one or two pixels thick. Selecting the final object may also include extracting features including color and area in pixels. Selecting the final object may also include discarding objects greater than eighty pixels in either direction. Selecting the final object may also include discarding objects smaller than sixteen pixels in either direction. Selecting the final object may also include discarding objects not colored white. Selecting the final object may also include discarding narrow and L-shaped objects.

The method may also include reading barcode in the final candidate.

In another aspect, the invention features an image processing system for a wearable vision-inertial self tracker including an inertial measurement unit (IMU); a sensor fusion core (SFC) including means for acquiring, tracking and tracquisitioning a two-dimensional (2D) bar-code fiducial; and a smart camera device.

One or more of the following may be included. The system may also include a link to an augmented reality (AR) system or robot.

In another aspect, the invention features a two dimensional (2D) fiducial design for image processing. The design includes a sequence of concentric rings, each of the rings including a plurality of mono-colored information sectors, each sector being of approximately a same size such that inner rings have fewer sectors than outer rings.

One or more of the following may be included. A subset of the sectors can be reserved for connectivity of all black areas in a blob and/or for positional information.

Embodiments of the invention may have one or more of the following advantages.

A fiducial design provides much higher information density for a given area than previous designs, in which the coding is essentially 1-D, yet provides the sub-pixel accuracy of centroid location that makes circular fiducials popular.

A process is provided for detecting, reading and tracking the fiducials based on homomorphic image processing which is fast and simple, yet robust in the presence of varied real-world lighting conditions.

An implementation running on a low-cost and low-power 16-bit DSP is provided, which has success in a variety of environments.

A wearable hybrid vision-inertial tracker design and implementation is provided.

A new 2D barcode fiducial design is provided that can generate thousands of different codes and can be used for wide area tracking.

Robust image processing methods are provided to extract fiducials from the scene in tracking, acquisition and tracquisition modes and to read their barcodes.

Fiducials can be robustly extracted in real time from a scene including barcode reading with almost zero false alarm rate, using a simple low-power Digital Signal Processor (DSP).

A uniquely defined point on the fiducial can be found with great accuracy and speed.

Black and white fiducials may be printed on a standard laser or ink-jet printer on 8.5×11 inch paper for office-high ceiling and on 11×17 inch paper for high-ceiling buildings (e.g., >3.5 m).

Other features, objects, and advantages of the invention will be apparent from the description and drawings, and from the claims.

DETAILED DESCRIPTION

Figure 1:
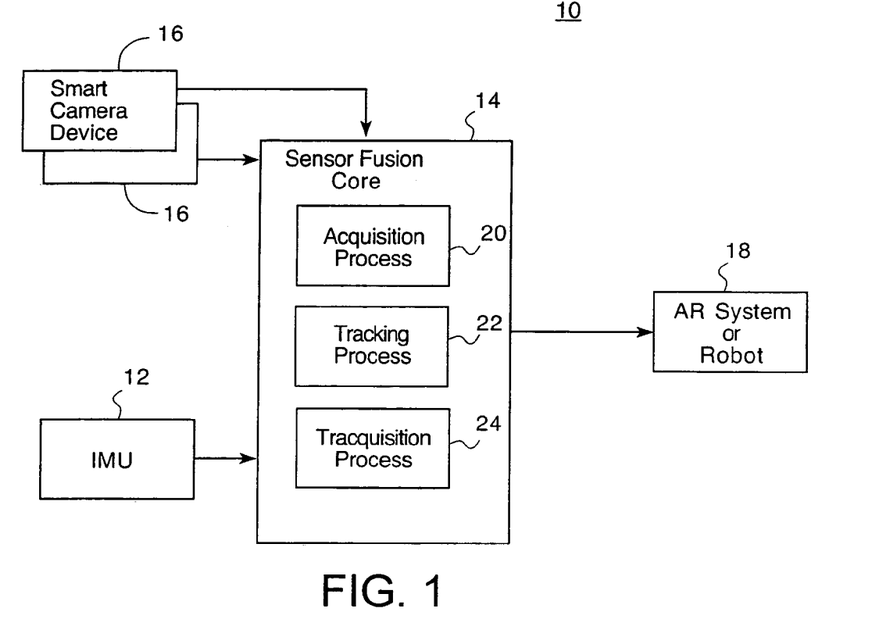
FIG. 1 is a block diagram of a tracking system.

Referring to FIG. 1, a tracking system 10 includes an inertial measurement unit (IMU) 12, a sensor fusion core (SFC) 14, and one or more smart camera (SC) devices generally labeled as 16. The SFC 14 poses updates to an augmented reality (AR) system 18 or robot (not shown).

In an example, the IMU 12 and SC devices 16 are housed in an assembly generally referred to as a sensor assembly (not shown), which is often adapted to mount on the head of a user or mounted on a robot, and the SFC 14 is housed in a belt-mounted electronics unit that includes a CPU board, a battery and a DSP image processor board, which is often strapped to the waist of the user.

The IMU 12 senses angular rate of rotation, gravity and earth components along three perpendicular axes. The angular rates are integrated to obtain the orientation (yaw, pitch, and roll) of the sensor. Gravitometer and compass measurements are used to prevent the accumulation of gyroscopic drift.

Each SC device 16 is an image processing board based on, for example, an ADSP 2185 chip, and a 640×480 progressive-scan black and white charge-coupled device (CCD) with a micro-video lens having a 108° diagonal view to detect artificial fiducials in an image, read their codes during initialization, and extract their centroids during tracking. In other examples, the SC devices 16 may be general sensors, lasers, sonar units or radar units.

Although the SC device 16 can theoretically process up to 30 frames/sec, the actual number of frames is smaller and depends on shutter speed. Image transfer from the CCD takes 33 ms, so for 8 ms shutter speed, 1/(0.033+0.008) =24.4 frames/sec.

The SC device 16 is programmed to perform three main functions in response to serial port commands from the SFC 14.

First, the SC device 16 includes an acquisition process 20. When the SFC 14 is first trying to acquire its pose after the system 10 is turned on, or when trying to re-acquire after the system 10 has become lost due to a prolonged occlusion, it sends an acquisition command to the SC device 16, which searches the entire image to find any and all fiducials in view, and returns the u, v coordinates and ID codes of the best four or five of them. The SFC 14 looks up pre-stored 3D x,y,z locations of these fiducials in the map, and then solves a 4-point pose recovery problem.

Second, the SC device 16 includes a tracking process 22. Once an initial pose estimate has been found, the SFC 14 enters tracking mode in which the measurements from the SC device 16 are only used to make small corrections to the pose calculated by the inertial sensor, through a complementary Kalman filter. Using a predicted pose of the inertial tracker, the SFC 14 sends a tracking command requesting the SC device 16 to only search in a small rectangular area about the location where it expects to see a certain fiducial in the image, and return the precise u,v coordinates of the centroid of the blob found. Because the search box is normally only large enough to contain one fiducial, there is no need to read the barcode, and image processing is performed very fast.

Third, the SC 16 includes a tracquisition process 24. This SC device 16 command is used during automapping mode to build a map of the fiducial constellation after installation. A user first acquires using four "seed" fiducials whose x,y,z locations are measured manually and downloaded to the tracker. Once the tracker enters tracking mode, the user may then switch it into automapping mode, which uses a simultaneous localization and map-building (SLAM) filter based on an augmented state vector containing estimates of all the initialized fiducial positions in addition to the tracker states. During automapping mode, the SFC 14 schedules measurements of already observed fiducials using the tracking command, supplemented with about 10% exploratory measurements using the "tracquisition" command to ask the SC device 16 to try to find new fiducials to add to the map. The task of the SC device 16 for "tracquisition" is similar to tracking in that only a portion of the image needs to be searched, but similar to acquisition in that any objects found in that area must have their barcodes read to determine that they are bona fide fiducials. When the SC device 16 returns the barcode, center, and size of a newly found fiducial, the SFC 14 initializes a new point in the growing map with the appropriate ID code and an initial position estimate deduced from the returned u,v position and approximate distance, then proceeds to refine the position estimate using the SLAM filter as subsequent tracking measurements come in.

In operation, the SC device 16 is head-mounted on a user. The IMU 12 and SFC 14 are typically combined and housed in a sensor assembly for mounting around a waist of the user. The SC device 16 is arranged so as to provide images to the IMU 12 and SFC 14. The SC device 16 may provide either an analog or digital video signals to the IMU 12 and SFC 14. The IMU 12 and SFC 14 capture the video images from the SC device 16 in real-time and transfer the images to a graphics processor (not shown) in the AR system 18. The graphics processor generates an augmented reality environment by adding to the images provided by the SC device 16 computer generated graphics. These composite images are then displayed on a head mounted display (not shown) by the graphics processor.

For each received video image, i.e., frame, the tracking system 10 attempts to determine a head pose from landmarks' positions in the images. A landmark is a feature in an image that has a known position with respect to objects within the image. The term fiducial refers to landmarks that are added to objects to facilitate registration.

Different approaches to fiducial design have been used. One type of fiducial design is a contrasting concentric circle with a sequence of black and white (or color or retroreflective) rings. Circular fiducials have an advantage that the center is the centroid, is invariant to viewing direction and angle (except for a small perspective distortion offset which can be compensated exactly if the viewing angle is known), and can be determined with sub-pixel accuracy which increases with the size of the fiducial because the larger the number of pixels going into the centroid calculation, the more the individual pixel noise averages out. The CCC approach inherits these advantages of the ordinary circle, but adds a reliable check that an object is a fiducial because the centroids of all the rings must coincide, and has an advantage that fiducials can be recognized from a wide range of distances. However the ability to generate significant numbers of different codes is poor, making this approach applicable with at most a few hundred fiducials installed.

Another type of fiducial design is a square box fiducial with some codes inside. Square fiducials have an advantage that lines are invariant under perspective transformation, so if the lens distortion is small then the fiducial boundary can be identified as four intersecting lines, which can be found quickly by testing colinearity of several test points. Inside the square box one may place some barcode-type patterns or any arbitrary designs for template matching. The latter approach is limited though, because for any large database, template matching becomes a computationally expensive procedure with high-rate of false alarms. Worse yet, if lens distortion is significant, then image processing would need to undistort the whole image in real-time in order to apply accurate template matching. Since the centroid of a square under perspective transformation shifts depending on viewing direction, one must instead find the center using the corners, for example by intersecting the two diagonal lines which connect opposite corners. However, to find the corners with the same degree of noise-reducing sub-pixel averaging as the centroid of a circle would require first fitting lines to a large number of sample points found along the boundary edges, which would be much more expensive than the simple centroid operation used for circles.

We use a black-and-white circular fiducial design and image processing. Because of the built-in "blob analysis" functions (measurement parameters of image objects) in the system 10, we wanted as well to design a fiducial that would read as a single fully-connected blob, so that by the time the segmentation operation was done we could get the centroid result with no further processing. In computer graphics, a blob is a visual object that has "an interesting shape type" that is flexible and amenable to animation.

Figure 2:
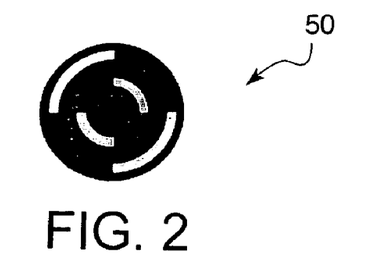
FIG. 2 is block diagram of a first fiducial design.

Referring to FIG. 2, a first fiducial design 50 is shown. Here we tried to increase the number of codes by dividing the fiducial 50 into four sectors and reading codes in two orthogonal directions. Compared to an ordinary multi-ring barcode in which the code is read only along one scan line through the center, this design could potentially allow almost twice as many bits of information for a given size. However, in order to guarantee that stray objects were never mistaken for fiducials, we restricted the design 50 to having one ring of white in each direction (so we could count 6 B/W transitions in each direction for a true fiducial), and in order to keep it as a singly-connected black blob, we disallowed codes in which the stripe in one direction was at the same or adjacent position to the stripe in the other direction. As a result, a fiducial with seven active rings could only produce a few tens of different codes.

Figure 3:
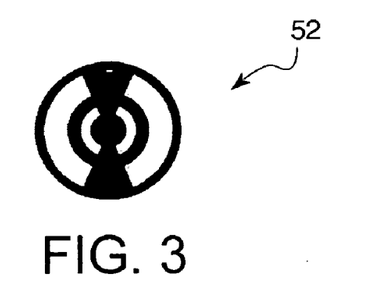
FIG. 3 is block diagram of a second fiducial design.

Referring to FIG. 3, a second fiducial design 52 is shown. The design 52 guarantees connectivity through the black cut-outs, and we determined that we could adequately test for "fiducialness" by testing the symmetry of the color-change points on the left and right of the center, so we allowed all $2^7$ codes.

Fiducial designs 50 and 52 are fast and easy to process. During the tracking process 22, the symmetrical disposition of the white holes caused their effects on the centroid of the black circle to cancel out, so we could just find the single blob and report its centroid position as if it were a solid black circle. However, designs 50 and 52 were unsatisfactory in terms of information density. If we wanted thousands of codes we would need a dozen rings or more, which would never fit on an 8.5×11 inch paper and be viewable from a good distance.

Figure 4:
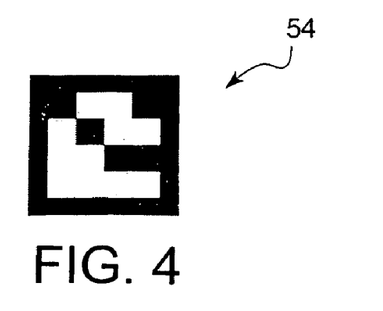
FIG. 4 is block diagram of a third fiducial design.

Clearly we needed a 2D barcode scheme similar to the DataMatrix codes that are used for product identification labels because they take so much less space than traditional 1-D barcodes with comparable capacity. Referring to FIG. 4, a fiducial design 54 illustrates that even an area just six times as wide as the basic feature size can encode 14 bits of data (as compared to 7 bits for a CCC with diameter seventeen times the feature size).

A perceived obstacle is the nonsymmetrical distribution of white areas inside a circular data matrix fiducial would make it impossible to find the center using the simple centroid operation we depend on, and trying to fit an ellipse to the outside edge would be much too slow and inaccurate. It occurred to us that one solution would be to find the fiducial, read the barcode if necessary (acquisition or tracquisition mode), and then flood fill all the interior white areas with black to make a solid circle and find its centroid. However, we found that this filling operation was too slow.

We realized that there was no need to actually fill the fiducial, and produced a "virtual filling" algorithm that allowed us to find the exact centroid as if it had been filled, without performing any additional image processing operations. A key to the virtual filling algorithm is that the segmentation operation that finds the centroid and area of the hole-riddled black object also finds the centroid and area of each of the white objects that are its holes. It is easy to identify all the white objects that are completely inside the black object, and then the centroid of the filled object is just the sum of the centroid times the area of all the objects which make it up.

Figure 5A:
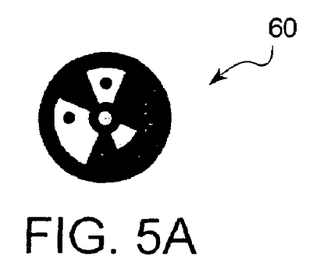
FIGS. 5A, 5B and 5C are block diagrams of byte code designs of a fiducial design.
Figure 5B:
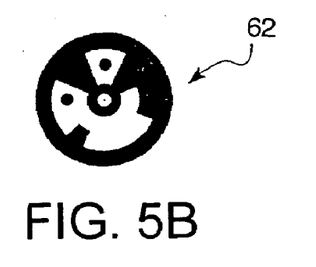
Figure 5C:
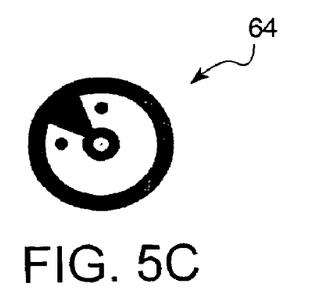

Using the virtual filling algorithm that allows us to have asymmetrical white areas in the interior, we combined the DataMatrix concept with the benefits of the CCC to produce a final fiducial design. Referring to FIGS. 5A, 5B and 5C, a fourth code 60, a fifth code 62 and a sixth code 64, all of the same fiducial design, are shown. Codes 60, 62 and 64 have bar codes 101, 1967 and 32767, respectively. These codes 60, 62 and 64 have $2^{15}$=32768 possible codes, described below in detail.

Suppose that the fiducial diameter is D=8 u, where u is one length unit. If a fiducial is 6-inch diameter then u=6/8=0.75 inches. Every fiducial has an outer black ring of 1 u width, two data rings, each of which is 1 u wide, and an inner black ring with 1 u width. The structure of outer ring is always black. The structure of inner ring includes a black circle of diameter 2 u with a white "eye" in the center with ⅜ u diameter. This eye is used in the acquisition process 20 and tracquisition process 24. The structure of data rings is divided into eight equal sectors with 45° degrees for each sector. Three sectors have specific structure. Two of them are used to determine fiducial orientation for identifying the barcode reading grid points. These sectors are white with a ⅜u black eye inside. They are located 1⅞u from the center. The three eyes form a 45-45-90 triangle. Between these two sectors there is a special black sector, which guarantees connectivity of all the black color (except the two black eyes) into a single blob. The other five sectors contain actual data cells, three per sector, totaling fifteen quasi-trapezoidal data cells, which can be colored either black or white.

If there is a need to further increase this number, then several options may be considered. By way of example we mention here just five of them. The first two keep the size and structure of the shape the same, but make barcode construction slightly more complicated. In this case the totally black sector is used for coding as well. A straightforward extension is to allow three combinations of its outer data ring cells, being white-black, black-white or black-black. Then the total number of codes is $3 \times 2^{15}$. We can increase this number even further almost to $2^{18}$ if we allow arbitrary colorings in this sector, but then we have to exclude codes where there is no connectivity between the inner and outer black rings.

Two other ways to increase the number of codes are to increase the number of data sectors or rings. Having seven data sectors with data instead of five increases the number of codes to $2^{21}$. Another extension that requires bigger size but gives an extremely large number of barcodes is to have three (or more) data rings instead. Fortunately, increasing the size here by 20% increases the number of possible codes to $2^{40}$ or more. With a few more rings, this design may be useful in traditional 2-D barcoding applications. A fifth way to increase the number of codes would be to use color. With six colors, the number of codes jumps from $2^{15}$ to $6^{15}$. However, as already mentioned, the use of a color camera would make it more difficult to find the true centroid of the overall circle, since the centroids of differently colored regions are shifted in different directions according to the pattern of pixel color assignments in the Bayer filter of the camera.

Robust performance is hard to achieve when the system 10 is required to track over an extended area. Most vision-based systems can operate only in specific lighting conditions or must be manually tuned-up for specific lighting scenarios. In wide-area tracking, the user will move from room to room with different light conditions, so the image-processing methods need be robust enough to handle various conditions including daylight through the windows, fluorescent light from the ceiling in offices, and showroom lights with strong point sources and weak background illumination. Any combination of these is possible, including situations where the ceiling-mounted fiducials are very dimly lit and subject to strong gradients in illumination, and the system should adapt without user intervention.

In the past, little attention was paid to the problem of variable lighting, and fiducial objects were extracted through color segmentation or simple thresholding. A more complicated scheme has been presented using a rule-based approach that looks for groups of samples of similar color that are likely to all belong to the same fiducial. However, this approach depends completely on use of a color camera and image processing, and also requires a specifically designed CCC fiducial with even lower information density than a generic multi-ring fiducial. A more general attempt to overcome lighting difficulties in AR vision-based tracking is done using the watershed algorithm for segmentation. However, the watershed algorithm is computationally costly and difficult to run for real time applications using reasonable portable CPUs.

Our goal is simply to distinguish black and white areas of paper, which sounds like an easy task for a simple threshold operation. A problem is that the grayscale values of both black and white regions vary tremendously according to the illumination. Under normal daylight conditions, white paper can vary from 70 to 255 in 8-bit gray scale values, while black is typically 20-50. However, a fiducial located near a window may have a black level of 80, while in the opposite corner of the same room, the level of white would be 55. Under just incandescent lighting, the white level can be as low as 5-10, while black level is 0-3.

The situation may become even worse when there is a strong light toward the camera from the ceiling and the fiducial to be detected is placed near this light. The light causes a blooming effect in the image sensor, in which the brightness is elevated in the area surrounding the light, falling off with distance from the light. The black level of the part of the fiducial near the light is higher than the white level of the same fiducial on its further side. For example, the white level can decrease from 120 to 55 along the sheet of paper, while on the same fiducial black is going down from 70 to 30.

We apply a modified form of homomorphic image processing that is designed to eliminate the effect of non-uniform lighting in images. The concept is to model the grayscale image as a product of illumination and reflectance values:

$$f(n_1,n_2)=i(n_1,n_2)r(n_1,n_2)$$

and assume that the illumination factor $i(n_1,n_2)$ varies relatively slowly compared to the reflectance $r(n_1,n2)$. In ordinary homomorphic processing, one takes the logarithm of the image in order to separate i and r into additive terms:

$$\log f(n_1,n_2)=\log i(n_1,n_2)+\log r(n_1,n_2)$$

then applies a high-pass filter designed to attenuate the slowly-varying illumination term, then exponentiates to get back a good looking image. Normally, the high-pass filter is chosen with a cutoff frequency just above 1 cycle/image, in order to kill the illumination gradient without affecting the reflectance image too much. This requires a large and expensive filter. Realizing that we were not concerned with restoring a good-looking image at the end, we decided to use a much higher cut-off frequency that could be implemented with a small convolutional kernel. Taking this to the extreme we settled on a 3×3 Sobel edge detector. This allowed us to find the edges of all the fiducials in the image, with complete immunity to any lighting variations gradual relative to the 3-pixel width of our filter. Even the relatively steep gradients produced by blooming near the lights are gradual on this 3-pixel scale, and we are able to reliably extract fiducials that are quite close to bright lights.

We determined that it was advantageous to skip the final exponentiation that is normally used to restore the image to human-viewable brightness levels. This not only saves time, but allows us to use a constant fixed threshold to find all the black/white edges in every image, regardless of lighting conditions. For example, consider that the difference in reflectance between white paper and black ink is always at least a factor of 2.5, which we determined experimentally by taking measurements of nearby pixels on black and white parts of fiducials from a wide variety of test images.

When we take the log of an image consisting of grayscale values f $\in$[0, . . . , 255], we create a new image $$p(n_1,n_2)=105.89*\log(f(n_1,n_2)+1)$$

where scaling has been applied so that p is also in the range [0, . . . , 255]. Consider the grayscale difference between processed pixels on the black side and the white side of an edge:

$$\Delta p @ p_w - p_b = 105.89*\log\frac{f_w+1}{f_b+1} \geq 105.89*\log 2.5 = 42$$

So the logarithm (which, in one example, we implemented with a fast LUT) serves as a contrast enhancement operation that guarantees that the contrast between neighboring black and white pixels will always be at least 40 gray levels, whether their original intensities had been 1 and 3, 5 and 13, or 100 and 250.

Following contrast enhancement, we apply a Sobel edge detector, which is good for extracting circular edges, and runs fast on simple hardware. The edge-detected image will have values of at least 20 along strong black/white boundaries with contrast of at least 40, and much lower values elsewhere. For any original image one can now use a fixed value of threshold to find all the true black/white edges. We found that a threshold of 11 (after a blur filter to attenuate small objects and soft edges) guarantees that at least 90% of the original fiducials are usually detected. We use this basic sequence of contrast enhancement and edge detection in both the acquisition and tracking processes 20, 22.

Figure 6:
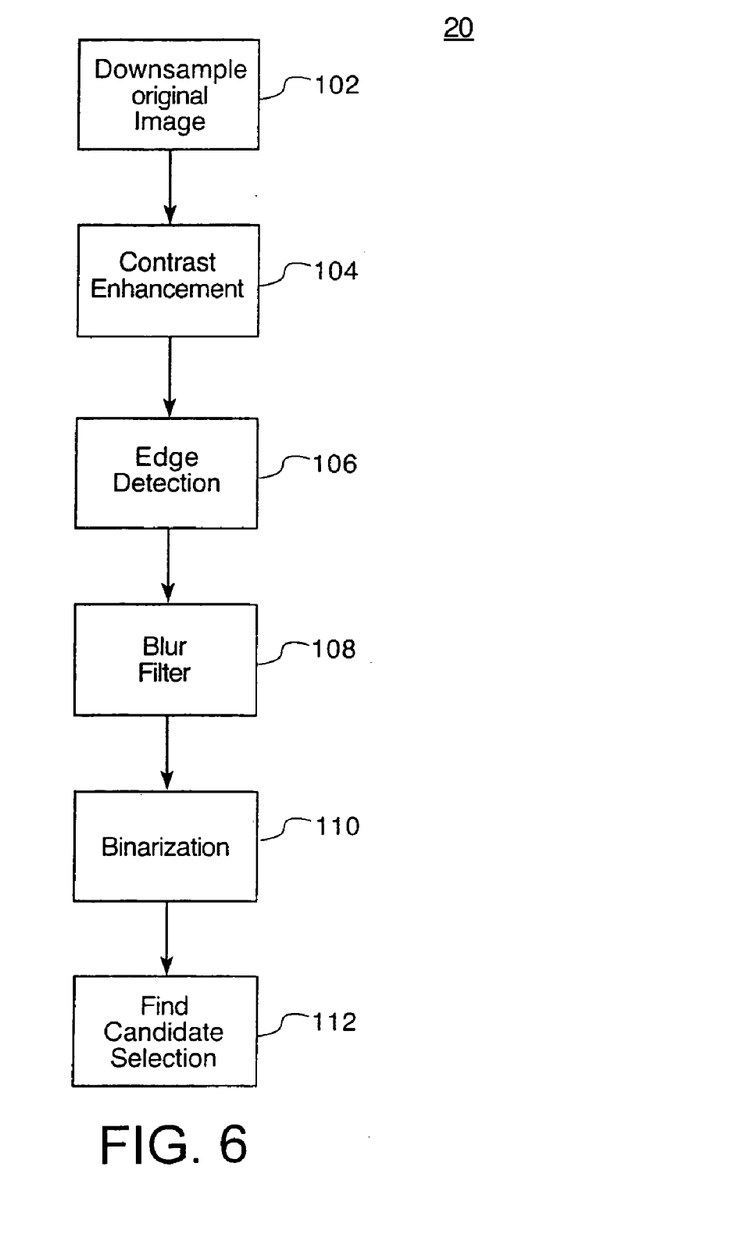
FIG. 6 is flow diagram of acquisition.

Referring to FIG. 6, the acquisition process 20 is used to identify potential candidate objects that might be fiducials is shown. The candidates are tested one at a time to see if they have barcodes that can be read. The process 20 includes downsampling (102) an original image to 320×240 for speed and enhancing (104) contrast. The process 20 detects (106) an edge, filters (108) blurs and binarizes (110) the image with threshold value of 11. The process 20 selects (112) a final candidate.

Selecting (112) a final candidate involves several operations. A first operation is image erosion. There are still too many small objects in the image. Due to the nature of the hardware it is very fast to implement an erosion operation along the horizontal direction only, which removes objects 1 or 2 pixels thick. A second operation is feature extraction. At this stage we apply a feature extraction procedure, where all remaining objects (typically 10-80) are labeled and their properties are computed (color, area in pixels and min and max extent in both u and v directions). Another operation involves size, color and area tests. In an example, objects greater than 80 pixels in either direction are thrown out. Objects smaller than 16 pixels in either direction are thrown out, since with feature size less than 2 pixels it might not be possible to correctly read their barcode in the next stage. Only white objects are considered. Since fiducials are circles, they should appear approximately elliptical in images, which implies $$A \approx \frac{\pi}{4}(u_{max} - u_{min})(v_{max} - v_{min}).$$

Applying this formula with some margins allows omitting narrow and L-shaped objects.

Figure 7:
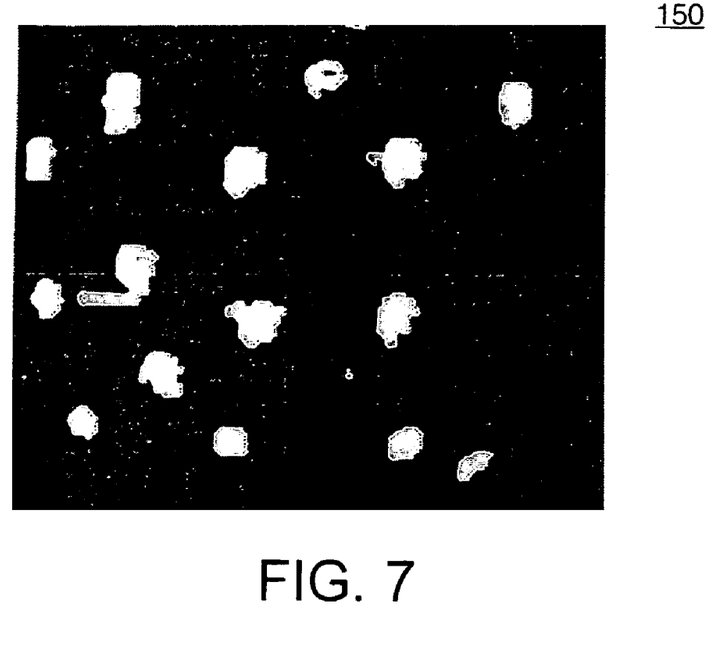
FIG. 7 is block diagram of a resulting image.

Referring to FIG. 7, a resulting image 150 after all weed-out tests is shown. Typically at this stage we have 90% of the good fiducials plus a few extraneous objects selected as candidates for barcode reading.

Figure 8:
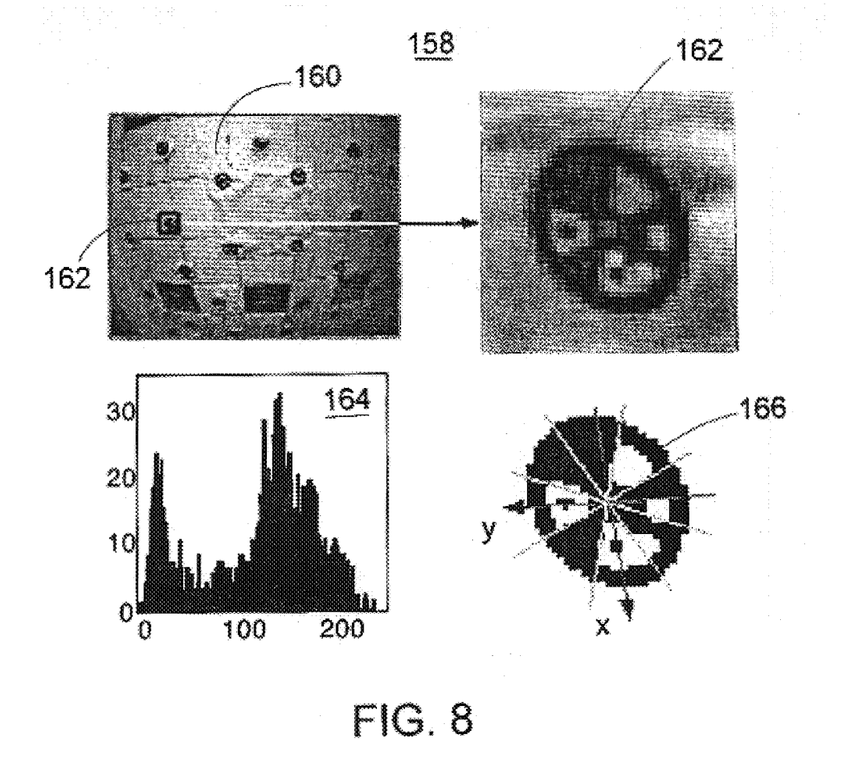
FIG. 8 is block diagram of a barcode reading.

Referring to FIG. 8, a clip 158 includes an original picture 160 showing a single fiducial 162 selected. A histogram 164 for fiducial 162 is illustrated, along with a corresponding binarized fiducial 164 at level 71 with axes and sectors for barcode reading. When process 20 is finished, then each successful candidate is checked for a barcode as illustrated in FIG. 8. We return to the original grayscale image and compute a histogram for each sub-area surrounding a fiducial candidate. The minimum of the histogram between the peaks corresponding to black and white (in this case 71) is used as a threshold for binarization. If the binarized image 166 contains three black objects, two of which are small black "eyes" inside of the large object, and there is one small white "eye" in the center of the large object, then it is considered a fiducial. The white eye is used as an origin, and the vectors to the black eyes are used as u and v-axis basis vectors for determining the fifteen test points where we read a binary value to decode the fiducial. For the current fiducial design, there are eight pie-shaped sectors, each of which contains three test points (along the lines in 166).

Finally, if there are four or more fiducials detected, then the best four of them are sent to the SFC 14 for initial camera pose determination. When more than four fiducials have been read, the camera 16 picks the four which form a quadrilateral with greatest area, in order to minimize geometric sensitivity of a pose recovery algorithm.

The acquisition process 20, i.e., finding candidate objects and barcode reading, takes approximately 250 ms to complete. The tracking process 22 cannot have such a luxury, because high update rate and low latency are very important. Although tracking operates on a much smaller window (typically 30×40 versus 320×240) it is still impossible to implement the complete acquisition sequence. Fortunately, since the SFC 14 predicts the fiducial location within several pixels, there is no need to identify candidates or check barcodes.

Figure 9:
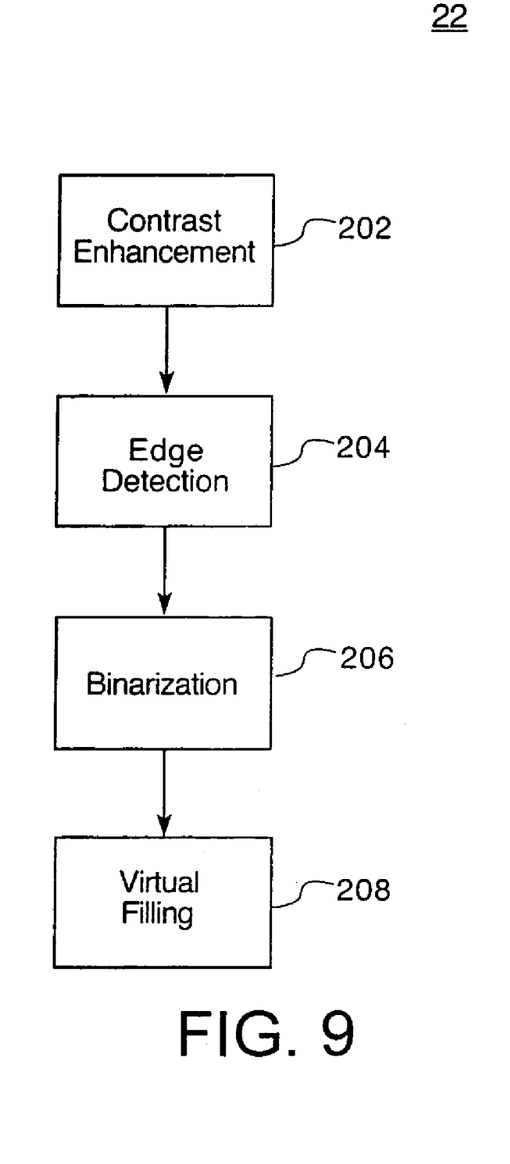
FIG. 9 is flow diagram of a centroid computation using virtual filling.

Referring to FIG. 9, the tracking process 22 includes enhancing (202) contrast, detecting (204) an edge, binarization (206) and virtual filling (208). Contrast enhancement (202) is followed by edge detection (204), and then local binarization is applied (206). The threshold value is constant for all lighting scenarios, but different from the one used for acquisition, because the blur filter is not used for tracking. At binarization (206) we have a big mass of black pixels related to the inspected fiducial, and some smaller objects related to paper edges and noise. They are removed by size and area tests similar to those used for acquisition. Finally, the fiducial is virtually filled (208) as described above, and its center of gravity is computed (210).

Before sending results back to the SFC 14, one additional test is applied to check symmetry. If the difference between the center of the bounding box and the center of gravity is too big, then the camera 16 reports that the fiducial failed the symmetry test and the Kalman filter does not use the measurement. This test is very effective at rejecting fiducials that are partially washed out or have been altered in appearance by objects between the camera and the fiducial paper.

Figure 10:
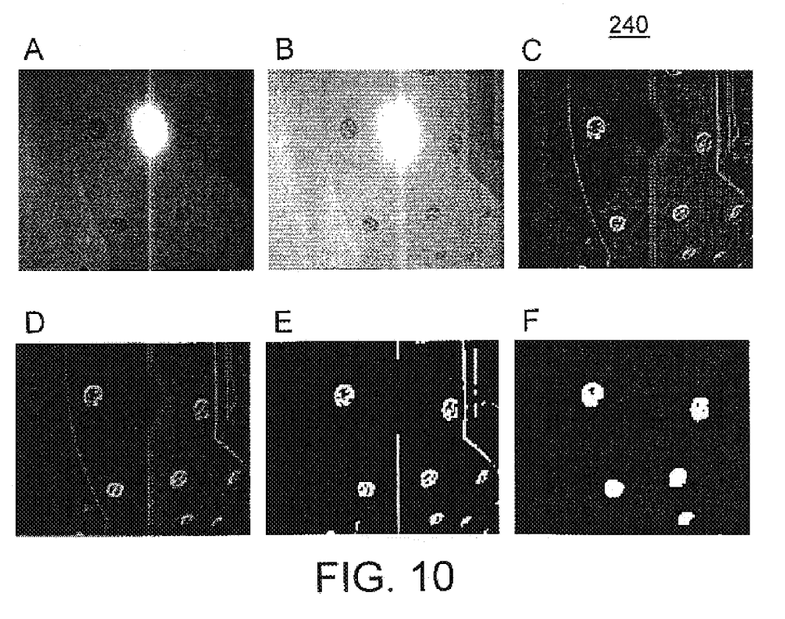
FIG. 10 is block diagram of an acquisition clip.

The system 10 may be used in acquisition for difficult lighting. FIG. 10 shows a clip 240 with a strong light source facing toward the camera lens. This light source creates a blooming effect in the CCD, and a light gradient across the image. Also, the image has really dark areas where markers are almost invisible to the human eye. The original image is shown on FIG. 10(a). After contrast enhancement, all the fiducials can be seen with equal contrast. Edge detection removes the light source because the blooming effect has soft edges. Finally, stray lines and the two smallest fiducials are removed by size, area and shape considerations. The resulting five fiducials can be read and used for successful acquisition.

Figure 11:
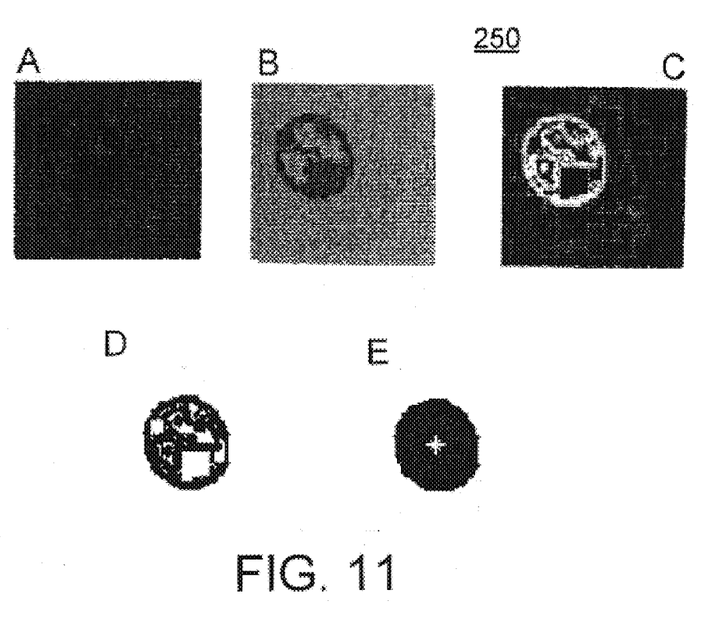
FIG. 11 is block diagram of a tracking clip.

Referring to FIG. 11, a clip 250 illustrates tracking for extreme light conditions. FIG. 11(a) illustrates a typical low-light scenario, where black grayscale values are 0-1, and white values are 1-3. Nothing is visible to the human eye. Applying a logarithmic contrast enhancement operation, we managed to get a visible result as shown in FIG. 11(b), resulting finally in an accurate centroid as shown in FIG. 11(e). There are additional sequences on the video clip that demonstrate that tracking works fine in very low light conditions.

The invention has been described above using fiducials that reflect ordinary ambient light in the visible regime. However, the basic concepts for encoding information in a 2-dimensional barcode pattern may also be used with fiducials fabricated out of a pattern of retro-reflective and non-retroreflective areas, illuminated by a light source nearly coincident with the camera(s) in order to achieve greater visibility in certain lighting conditions. Alternatively, the fiducials may be made with self-luminescent materials, or with transparent areas illuminated by a backlight so that they can be used in applications where ambient lighting is not sufficient. For any of these three basic illumination strategies (ambient, self-illuminating, or retro-reflective), the light source may be any color of visible light or it may be infrared or ultraviolet. A matching filter may be placed over the camera to reject other objects that are not illuminated with the selected wavelength in order to ease the image processing task. Accordingly, other embodiments are within the scope of the following claims.

What is claimed is:

1. A fiducial mark for detection by a camera comprising:
    a circular outer perimeter; and
    a pattern of contrasting regions on an inside of the outer perimeter that is not symmetrical about a central point of the fiducial mark, and that identifies an identity code.

2. The fiducial mark of claim 1 further comprising a two dimensional (2D) array of encoding areas, each of the encoding areas having a color selected from a set of N colors, and having approximately equal sizes.

3. The fiducial mark of claim 2 further comprising features for establishing a reference frame for reading the patterns.

4. The fiducial mark of claim 3 in which the features comprise:
a feature used to establish an origin; and
features used to establish an x-axis and y-axis positioning.

5. The fiducial mark of claim 2 in which the perimeter is a single color.

6. The fiducial mark of claim 5 in which the color is black.

7. The fiducial mark of claim 6 in which the encoding areas inside the circular outer perimeter are contiguous with the circular outer ring to segment as one large blob.

8. The fiducial mark of claim 7 further comprising one or more small blobs inside the circular outer perimeter designated as indexing features.

9. The fiducial mark of claim 1 in which the perimeter and the patterns have contrasting colors.

10. A method for finding a centroid of an outer rim of a fiducial comprising:
capturing an image of the fiducial;
filling an interior of the fiducial image to match a color of the outer rim resulting in one solid ellipse-like shape; and
calculating the centroid of the one solid ellipse-like shape.

11. The method of claim 10 in which capturing the image further comprises using a logarithm of the image for contrast enhancement.

12. A method comprising:
determining a centroid of a framing object and all interior objects of a fiducial image; and
calculating a centroid of a virtual filled object using a formula for the centroid of a combination object.

13. A method of detecting fiducial marks comprising:
capturing an image of a fiducial mark, the fiducial mark comprising a circular outer perimeter, a pattern of contrasting regions on an inside of the outer perimeter that is not symmetrical about a central point of the fiducial mark, and that identifies an identity code, a two dimensional (2D) array of encoding areas, each of the encoding areas having a color selected from a set of N colors, and having approximately equal sizes and features for establishing a reference frame for reading the patterns;
determining an origin of the image from a first feature; and
determining an x-axis and a y-axis position of the image from second features.

14. The method of claim 13 in which capturing further comprises using a logarithm of the image for contrast enhancement.

15. A hybrid tracking system comprising:
a camera for capturing an image;
an inertial measurement unit; and
a sensor fusion core including a means for detecting a fiducial within the image.

16. The system of claim 15 in which the fiducial comprises:
a circular outer perimeter;
patterns on an inside of the outer perimeter for reading an identity code including higher information density per area than a pattern of concentric rings,
a two dimensional (2D) array of encoding areas, each of the encoding areas having a color selected from a set of N colors, and having approximately equal sizes; and
features for establishing a reference frame for reading the patterns.

17. The system of claim 16 in which the means for detecting the fiducial comprises:
determining an origin of the fiducial from a first feature; and
determining an x-axis position of the fiducial from second features.

18. The system of claim 15 further comprising a cluster of cameras.

19. A two-dimensional (2D) fiducial for image processing comprising:
an outer ring of 1 u width;
two data rings, each data ring having a 1 u width; and
an inner ring with 1 u width, wherein u is one length unit.

20. The fiducial of claim 19 in which the outer ring is colored black.

21. The fiducial of claim 19 in which the inner ring comprises a black circle with a white eye in a center.

22. The fiducial of claim 21 in which the white eye has a diameter of ⅜ u.

23. The fiducial of claim 19 in which each of the data rings comprises eight sectors with 45° degrees for each sector.

24. The fiducial of claim 23 in which the eight sectors comprise:
five sectors containing data cells;
two sectors colored white with a ⅜ u black eye inside; and
one sector colored black, the black colored sector positioned between the two white sectors and guaranteeing connectivity of all black color into a single blob.

25. The fiducial of claim 24 in which the two sectors are located 1⅞ u from the center.

26. An image processing target comprising:
a black colored outer ring of 1 u width;
two data rings, each data ring having a 1 u width and including eight sectors with 45° for each sector; and
an inner ring of 1 u width comprising a black circle with a white eye in a center.

27. The target of claim 26 in which the eight sectors comprise:
five sectors containing data cells;
two sectors colored white with a ⅜ u black eye inside; and
one sector colored black, the black colored sector positioned between the two white sectors and guaranteeing connectivity of all black color into a single blob.

28. An image processing system for a wearable vision-inertial self tracker comprising:
an inertial measurement unit (IMU);
a sensor fusion core (SFC) including means for acquiring, tracking and tracquisitioning a two-dimensional (2D) bar-code fiducial; and
a smart camera device.

29. The system of claim 28 further comprising a link from the sensor fusion core to a augmented reality (AR) system.

30. The system of claim 28 further comprising a link from the sensor fusion core to a robot.

31. A two dimensional (2D) fiducial design for image processing comprising:
a sequence of concentric rings, each of the rings including a plurality of mono-colored information sectors, each sector being of approximately a same size such that inner rings have less sectors than outer rings.

32. The design of claim 31 in which a subset of the sectors is reserved for connectivity of all black areas in a blob.

33. The design of claim 31 in which a subset of the sectors is reserved for positional information.

* * * * *